United States Patent
Flynn et al.

(10) Patent No.: US 8,640,501 B2
(45) Date of Patent: Feb. 4, 2014

(54) NECK RING AND METHOD OF MAKING FOR A GLASS CONTAINER FORMING MACHINE

(75) Inventors: Robin L. Flynn, Waterville, OH (US); David L. Lewis, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1537 days.

(21) Appl. No.: 12/080,974

(22) Filed: Apr. 8, 2008

(65) Prior Publication Data

US 2009/0249835 A1 Oct. 8, 2009

(51) Int. Cl.
*C03B 11/00* (2006.01)

(52) U.S. Cl.
USPC .................................. 65/172; 65/247; 65/305

(58) Field of Classification Search
USPC ............................................ 65/172, 247, 305
See application file for complete search history.

(56) References Cited

U.S. PATENT DOCUMENTS

| 2,987,854 | A | 6/1961 | Payne |
| 3,272,612 | A | 9/1966 | Hamilton |
| 3,424,569 | A | 1/1969 | Huebner |
| 4,436,543 | A | 3/1984 | Kasten |
| 4,436,544 | A | 3/1984 | McCausland |
| 4,555,259 | A | 11/1985 | Williamson |
| 5,725,629 | A | 3/1998 | Olsen |
| 5,769,920 | A * | 6/1998 | Sweetland et al. .......... 65/374.15 |
| 6,840,062 | B1 | 1/2005 | Dakan, Sr. et al. |

FOREIGN PATENT DOCUMENTS

| DE | 3937476 A1 | 5/1991 |
| EP | 0546236 A2 | 6/1993 |
| JP | 06-016430 | 1/1994 |
| JP | 2004224697 | 8/2008 |

* cited by examiner

*Primary Examiner* — Joseph S Del Sole
*Assistant Examiner* — Russell Kemmerle, III

(57) ABSTRACT

A neck ring for molding a glass container neck finish that includes at least one closure attachment feature. The neck ring includes two semi-annular bi-metal neck ring halves, each consisting essentially of a neck ring insert of wear-resistant metal construction, and a neck ring body of heat-conductive metal construction different from said wear-resistant metal construction and formed around said neck ring insert so as to embed it in said neck ring body. Each of said neck ring halves has a glass-contacting cavity face that includes a first surface portion formed by said inserts for molding the at least one closure attachment feature on the neck finish, and a second surface portion formed by said bodies for molding portions of the neck finish excluding the at least one closure attachment feature.

9 Claims, 2 Drawing Sheets

NECK RING AND METHOD OF MAKING FOR A GLASS CONTAINER FORMING MACHINE

The present disclosure relates to a neck ring for molding a glass container neck finish that has at least one closure attachment feature, and to a method for making such a neck ring.

BACKGROUND AND SUMMARY OF THE DISCLOSURE

In glass container forming machines, the containers typically are formed in two stages. At a first or blank mold stage, a charge or glob of molten glass is formed in a blank mold into a parison or preform. A neck ring is positioned adjacent to the blank mold, and the container neck finish is formed against the neck ring to final size and geometry. The parison then is transferred by means of the neck ring to a blow mold, in which the container body is formed to final size and geometry. The neck ring typically consists of two semi-circular neck ring bodies of cast bronze or steel construction.

It has been proposed in to assemble premade inserts to precast neck ring bodies to obtain more precise tolerances and wear resistance properties in the portions of the neck ring that contact the molten glass and form the closure attachment feature(s) of the container neck finish. However, there still remains a need to eliminate a specific commercial variation in the glass container as formed in the first or blank mold stage, known as a "hollow neck" variation, which is caused when insufficient heat is removed from the glass neck finish area at the parison forming stage. A general object of the present disclosure is to provide a neck ring and method of manufacture that achieves good wear resistance in the neck ring where it is needed most while drawing heat from the neck finish and minimizing the temperature gradient between the neck ring and the guide plate to reduce checks or other variations in this area. The neck ring bodies should also provide rapid heat removal from the glass in the non-attachment area of the finish being formed to thereby eliminate hollow neck defects.

The present disclosure embodies a number of aspects that can be implemented separately from or in combination with each other.

A neck ring for a glass container forming machine, in accordance with one aspect of the present disclosure, includes two semi-annular bimetallic neck ring halves. Each neck ring half includes an insert made of wear-resistant construction, such as nickel, bronze or steel, and a body of heat-conductive metal construction, such as bronze or steel, in which the insert is embedded. The cavity face of the neck ring thus includes a first portion formed by the wear-resistant inserts that are configured for molding closure attachment features in the container neck finish, and a second portion formed by the neck ring bodies configured for molding portions of the container neck finish that do not include the closure attachment features. The neck ring body material exposed at the second portion of the cavity face provides rapid heat extraction from the molten glass to reduce or eliminate hollow neck variations in the molded containers, while the material of the inserts at the first portion of the cavity face provides good wear-resistance.

A method of making a neck ring for a glass container forming machine, in accordance with another aspect of the present disclosure, includes first forming a finish attachment feature-forming component as a separate preform of wear-resistant material such as nickel, bronze or steel, and then embedding this feature-forming component into a body of heat-conductive metal construction, such as bronze or steel, that is provided with a surface for mold-forming the portion of the container neck finish that does not include the closure attachment features.

BRIEF DESCRIPTION OF THE DRAWINGS

The present disclosure, together with additional objects, features, advantages and aspects thereof, will be best understood from the following detailed description, the appended claims and the accompanying drawings illustrating an exemplary but presently preferred embodiment of the disclosure, in which:

DETAILED DESCRIPTION OF PREFERRED EMBODIMENTS

Figure 1:
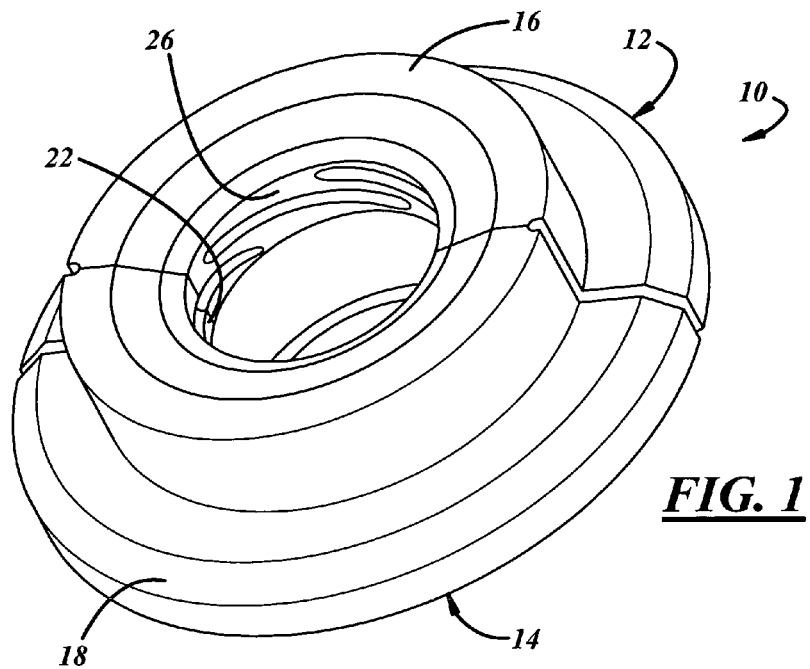
FIG. 1 is a perspective view of a neck ring in accordance with an exemplary embodiment of the present disclosure.
Figure 2:
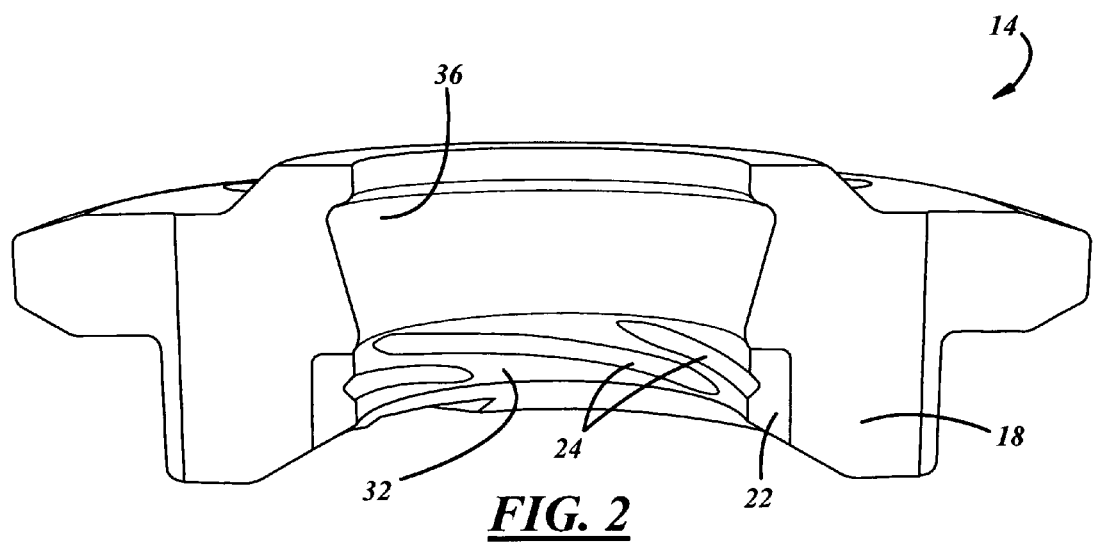
FIG. 2 is an elevational view of one of the neck ring halves in the neck ring of FIG. 1.
Figure 3:
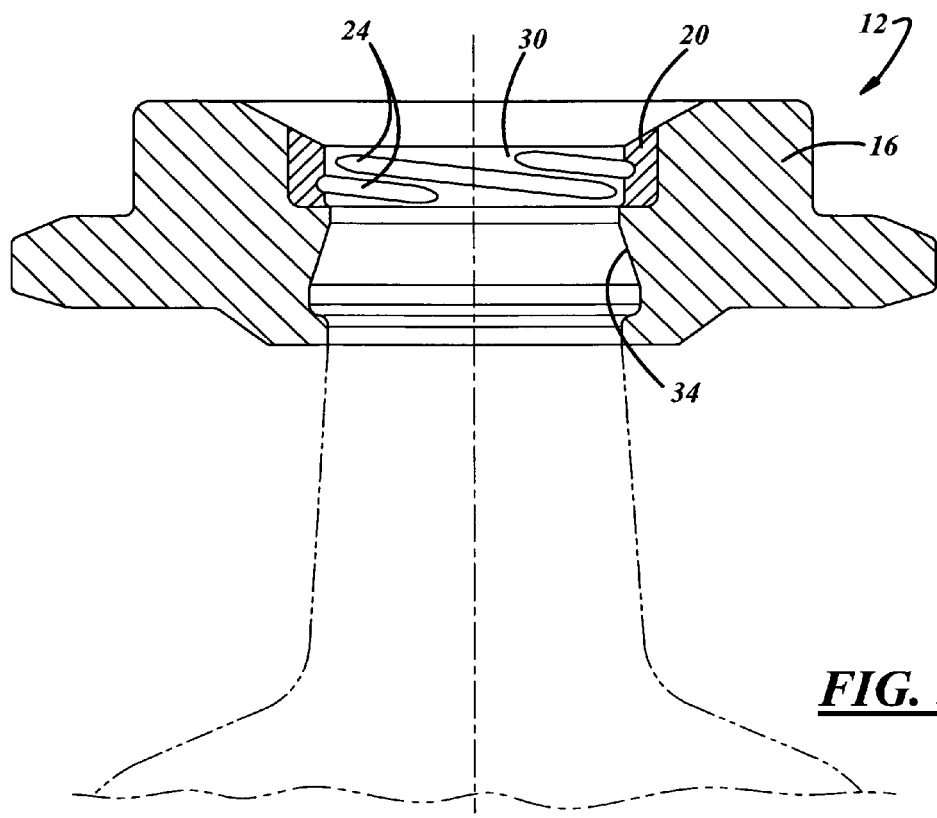
FIG. 3 is a schematic illustration of the neck ring in the embodiment of FIG. 1 forming the neck finish of a glass container.
Figure 4:
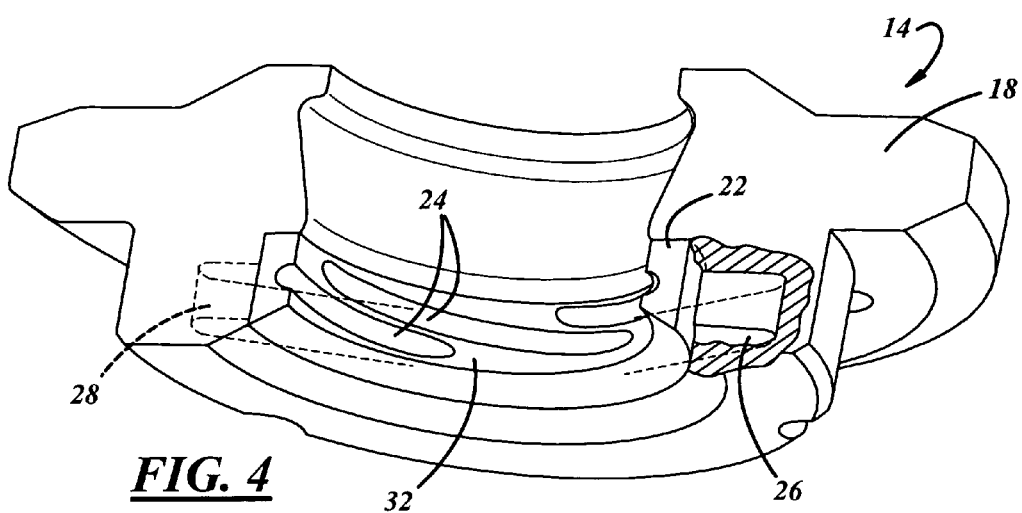
FIG. 4 is a perspective view of the neck ring half in FIG. 2 with the neck ring body partially sectioned to illustrate embedment of the neck ring insert in the neck ring body.

FIG. 1 illustrates an annular neck ring 10 for a glass container forming machine as including two semi-annular neck ring sections 12, 14. FIG. 1 illustrates sections 12, 14 in abutment for forming a container neck finish and transporting the container parison from the blank mold station to the blow mold station as previously described. FIGS. 2 and 4 illustrate neck ring section 14 in greater detail, while FIG. 3 illustrates neck ring section 12. Neck ring sections 12, 14 are essentially mirror images of each other. The illustrated geometries of neck rings 12, 14 are exemplary.

Neck ring sections 12, 14 include associated semi-annular neck ring bodies 16, 18. Neck ring bodies 16, 18 preferably are of near-net-shape die-formed powder metal construction or investment castings, such as bronze or steel construction. Each neck ring section 16, 18 also includes an associated semi-annular insert 20, 22. Inserts 20, 22 preferably are preformed and insert-molded into the associated neck ring body 16,18. Inserts 20, 22 have internal surfaces that form the closure attachment feature(s) on the container neck finish, such as internal spiral recesses 24 for forming external thread segments on the container neck finish or an internal groove for forming a crown finish. Inserts 20, 22 preferably also have external tabs or ears 26, 28 (FIG. 4) that become embedded and anchored in the neck ring bodies as the neck ring bodies are formed around the inserts. The preformed inserts thus are held firmly in place in the formed neck ring bodies. Inserts 20, 22 can be cast or machined of a suitable metal, preferably different from the metal of neck ring bodies 16, 18, such as nickel, bronze or steel for example.

It is currently preferred to investment cast inserts 20, 22, and then to investment cast the premade inserts into neck ring bodies 16, 18 forming neck ring sections 12, 14. The investment cast sections can then be machined to desired dimensions. An alternative method would be to investment cast or die-form the inserts, and then place the pre-made inserts into a die in which bodies 16, 18 are formed around the inserts. A third option would be to form neck ring sections 12, 14 in a single step, in which powders for both the insert and the body are placed in a die, and the part is pressed and sintered.

It will be noted in particular in the drawings that the inside surfaces of inserts 20, 22 form the glass-contacting cavity face only where the finish attachment features are formed, in this example external thread segments on the container neck finish. Thus, the glass-contacting surface of each neck ring half includes a first portion 30 or 32 formed by the inside surfaces of inserts 20 or 22, and a second portion 34 or 36 formed by the inside surfaces of neck ring body 16 or 18 excluding inserts 20, 22. Stated differently, the glass-contacting cavity face of each neck ring half includes a first surface portion 30 or 32 formed by the inserts for molding the closure attachment feature(s) on the container neck finish, and a second portion 34 or 36 formed by the neck ring bodies for molding portions of the container neck finish that exclude the closure attachment feature(s). This construction allows each neck ring half to achieve optimum performance desired in the parison-forming stage of glass container manufacture. The material used in the molding surfaces 30, 32 that provide the closure attachment feature(s) provides good wear resistance so that the attachment features are sharply defined. On the other hand, the material employed for bodies 16, 18 forming surfaces 34, 36 can be selected to provide rapid heat extraction from the glass material in the container neck finish area, which reduces or eliminates the "hollow neck" variation production problem previously discussed, which is caused when insufficient heat is removed from the molten glass as it solidifies in the neck finish area. The wear-resistant material of inserts 20, 22 also minimizes the temperature gradient between the neck ring halves and the associated guide plate of the neck ring section, which reduces check variations in this area.

Use of powder metallurgy for forming neck ring sections 12, 14 provides significant cost savings over current technology. Inserts 20, 22 can be premade and then secured within bodies 16, 18, or sections 12, 14 can be formed in a single operation. Furthermore, powder metals permit use of differing metals or metal alloys in the neck ring bodies.

There thus has been disclosed a neck ring construction for a glass container forming machine and a method of making a two-part neck ring. The disclosure has been presented in conjunction with an exemplary embodiment, and various modifications and variations have been discussed. Other modifications and variations readily will suggest themselves to persons of ordinary skill in the art in view of the foregoing description and drawings. The disclosure is intended to embrace all such modifications and variations as fall within the spirit and broad scope of the appended claims.

The invention claimed is:

1. A neck ring for molding a glass container neck finish that includes at least one closure attachment feature, said neck ring including:
   two semi-annular neck ring halves, each consisting essentially of a neck ring insert of wear-resistant metal construction, and a neck ring body of heat-conductive metal construction different from said wear-resistant metal construction and formed around said neck ring insert that said neck ring insert is embedded in said neck ring body,
   each of said neck ring halves having a glass-contacting cavity face that includes a first surface portion formed by said inserts for molding the at least one closure attachment feature on the container neck finish and a second surface portion formed by said bodies for molding portions of the container neck finish that exclude the at least one closure attachment feature.

2. The neck ring halves of claim 1 wherein said neck ring inserts each have protruding ears embedded and anchored in said associated neck ring bodies for anchoring said inserts in said bodies.

3. The neck ring set forth in claim 1 wherein said neck ring inserts are of nickel, bronze or steel construction, and said neck ring bodies are of bronze or steel construction.

4. The neck ring set forth in claim 3 wherein said inserts are of nickel construction and said neck ring bodies are of sintered powder metal bronze construction.

5. The neck ring set forth in claim 1 wherein said neck ring inserts form upper portions of said glass-contacting cavity faces of said neck ring halves and said neck ring bodies form lower portions of said glass-contacting cavity faces of said neck ring halves.

6. A method of making a neck ring for molding a glass container neck finish including at least one closure attachment feature, which includes the steps of:
   (a) providing two semi-annular neck ring halves each consisting essentially of a neck ring insert of wear-resistant metal construction, and a neck ring body of heat-conductive metal construction different from said wear-resistant metal construction,
   (b) forming said neck ring inserts as separate preforms,
   (c) forming said neck ring bodies around said neck ring insert preforms to thereby embed said inserts in said bodies,
   (d) providing on said inserts a first surface portion for molding the at least one closure attachment feature on the neck finish, and
   (e) forming a second surface portion on said bodies for molding those portions of the neck finish that exclude the at least one closure attachment feature.

7. The method set forth in claim 6 wherein said insert preforms are made with protruding ears that become embedded and anchored in said bodies in said step (c).

8. The method set forth in claim 6 wherein said inserts are formed of nickel, bronze or steel construction and said bodies are formed of bronze or steel construction.

9. The method set forth in claim 6 wherein said neck ring inserts form upper portions of glass-contacting cavity faces of said neck ring halves and said neck ring bodies form lower portions of said glass-contacting cavity faces of said neck ring halves.

* * * * *